United States Patent [19]

Chung

[11] Patent Number: 5,976,434
[45] Date of Patent: Nov. 2, 1999

[54] METHOD FOR PREPARING HYDROPHILIC POLYPROPYLENE MEMBRANE

[75] Inventor: Tze-Chiang Chung, State College, Pa.

[73] Assignee: The Penn State Research Foundation, University Park, Pa.

[21] Appl. No.: 09/055,824

[22] Filed: Apr. 6, 1998

Related U.S. Application Data

[62] Division of application No. 08/629,176, Apr. 6, 1996, Pat. No. 5,837,365.

[51] Int. Cl.$^6$ ................................. B29D 67/20; C08J 9/36
[52] U.S. Cl. .............................. 264/45.6; 264/48; 264/54; 521/55; 521/75; 521/98; 521/905
[58] Field of Search ............................... 264/45.6, 48, 54; 521/55, 75, 98, 905

[56] References Cited

PUBLICATIONS

Chung et al., "Kinetic Aspects of the Copolymerization between x–Olefins and Borane Monomer in Ziegler–Natta Catalyst", Reprinted from Macromolecules, Dec. 26, 1993, pp. 3019–3025.

*Primary Examiner*—Blaine R. Copenheaver
*Attorney, Agent, or Firm*—Thomas J. Monahan

[57] ABSTRACT

Polypropylene (PP) membranes having a hydrophilic surface have been prepared by extracting a fugitive hydrophilic pore-forming agent from a gelled film prepared by evaporating the solvent from a homogeneous solution of isotactic polypropylene, functionalized polypropylene and the fugitive agent in a solvent, such as xylene. Most of the functional groups, such as —OH, —NH$_2$ and —COOH, in the functionalized polypropylene are located on the surfaces of the membrane, including pore surfaces. The resulting membranes, especially membranes having an asymmetric structure, are useful for ultrafiltration, dialysis and/or microfiltration.

4 Claims, 7 Drawing Sheets

METHOD FOR PREPARING HYDROPHILIC POLYPROPYLENE MEMBRANE

RELATED APPLICATIONS

This application is a division of Ser. No. 08/629,176, filed Apr. 6, 1996, entitled NEW HYDROPHILIC POLYPROPYLENE MEMBRANES now U.S. Pat. No. 5,837,365.

FIELD OF THE INVENTION

This invention relates to hydrophilic functionalized polypropylene membranes which exhibit good mechanical strength and longevity and which are useful in the field of filtration, including ultrafiltration, microfiltration and dialysis. This invention also relates to a method for the manufacture of such membranes.

DESCRIPTION OF THE PRIOR ART

Many of the polymers which are used for commercially available synthetic membranes are hydrophobic polymers, such as polypropylene, poly (etherimides), poly (vinylidene fluoride) and polysulfones. Among these hydrophobic polymers, polypropylene has been used extensively in filtration membrane applications because polypropylene is chemically stable and mechanically sturdy, and can be used at relatively high temperatures. However, in spite of its extensive use in membrane applications, polypropylene is hydrophobic, i.e., non-wettable by water, and is impermeable to ions in an aqueous solution unlessa positive pressure gradient is applied. Moreover, polypropylene membranes, as well as membranes prepared from other hydrophobic polymers, are characterized by a flux decline that is caused by fouling due to solute adsorption and pore blocking.

It is generally accepted that the use of filtration membranes having hydrophilic surfaces can minimize fouling. Accordingly, if a hydrophobic polymer, such as polypropylene, were to be used to prepare a filtration membrane, it would be desirable to somehow provide the membrane with a hydrophilic surface. A primary limitation of polypropylene in the membrane field is the difficulty of producing polypropylene having hydrophilic surfaces.

Hydrophilization of polypropylene membranes generally is performed by chemical and physical modification using post-treatment processes. For example, U.S. Pat. No. 4,409,339 discloses chemically treating polyolefin membranes with a sulphonating agent, whereas Japanese Patent 62-19,208 discloses ozonation followed by polyol treatment Grafting hydrophilic monomers such as acrylonitrile (Japanese Patent 61-125,409) or acrylic acid (Japanese Patent 61-106,640) onto hydrophobic polyolefin macromolecules is another type of chemical post-treatment modification. A physical and temporary modificationof a polypropylene membrane, which is disclosed in Japanese Patent 58-96,633, involves wetting the membrane with a water-soluble solvent.

Although there are several prior art disclosures of treating polypropylene to render its surfaces hydrophilic, polypropylene has been one of the most resistant polymers to chemical modifications. The inert nature and crystallinity of polypropylene usually make it very difficult to chemically modify under mild reaction conditions; and in many cases, polypropylene modification reactions involve undesirable side reactions, such as degradation and crosslinking (G. Ruggeri, M. Aglietto, A. Petragnani and F. Ciardelli, Eur. Polymer J., 19, 863, 1983).

A variety of methods of producing dense or porous polyolefin films and membranes, and particularly polypropylene films and membranes, are known. For example, the preparation of a non-oriented, dense film comprised of a single phase blend of polypropylene and mineral oil is described in U.S. Pat. No. 3,201,364; whereas the preparation of porous polyolefin membranes is disclosed in U.S. Pat. No. 4,190,707 and in U.S. Pat. No. 4,539,256.

SUMMARY OF THE INVENTION

It is an object of the present invention to provide a new type of polyolefin membrane which is charaterized by having hydrophilic surfaces which can provide excellent fouling resistance when the membrane is used in various separation processes.

It is a further object of the invention to provide a process for preparing polypropylene membranes, including membranes having symmetric or asymmetric structures, which membranes are characterized by hydrophilic surfaces and good mechanical properties.

These and other objects and advantages of the invention are achieved by preparing polypropylene membranes from a newly developed functionalized polypropylene (T. C. Chung and D. Rhubright, Macromolecules 24, 970, 1991, T. C. Chung and D. Rhubright, Macromolecules 26, 3019, 1993) which has a high molecular weight and which contains from about 0.3 to about 10 mole % of functional groups, such as —OH, —H$_2$ or —COOH, in the side chains. These functionalized polypropylene polymers are useful for preparing the polypropylene films and membranes of the present invention because the presence of the functional groups in the polymer structure results in the polymer having hydrophilic rather than hydrophobic surfaces. In the membrane structure, the functional groups are located almost exclusively at the surfaces of membrane, including the surface of the pores, while the matrix of the membrane structure is comprised of hydrophobic polypropylene. Such a membrane structure provides a hydrophilic surface with a stearic hindrance for solutes that come near the surface. Adsorption of solutes can be prevented by appropriate choice of functional groups and their quantity on the membrane surface. Overall, the aim of this invention is to prepare dimensionally stable membranes which are permanently hydrophilic under filtration operating conditions.

In the membrane structures of the invention, pure polypropylene provides the matrix, while the functional groups in the functionalized polypropylene are located on the surface including the surface of pores in the porous structures. The membranes of the present invention may be prepared by casting a film from a solution of polypropylene (PP), functionalized polypropylene (PP—F), e.g., hydroxylated polypropylene (PP—OH), and a fugitive additive, preferably a polar hydrophilic additive, such as polyethylene oxide (PEG), polyvinyl pyrrolidone (PVP) or phenol, in a solvent, such as xylene. The incompatibility of the polar additives and the polypropylene results in a film having two phases, one phase consisting primarily of crystalline polypropylene (PP) which is a continuous phase. The second phase is comprised of the polar additives as a discrete phase, such as discrete spheres. The hydroxylated polypropylene (PP—OH) is located at the interfaces between the additive phase and the PP phase. The polypropylene segments in the hydroxylated polypropylene are co-crystallized with polypropylene and the hydroxy groups form hydrogen bondings with the polar hydrophilic additives. The polypropylene phase is highly crystalline (high melting point) and insoluble, whereas the second phase of additives is soluble in water or other solvent, which is a nonsolvent for polypropylene. Therefore, the second phase can be leached out, preferably with hot water, to convert the two phase film into a single phase, porous structure. The pore size can be controlled by the composition of the polymer blend and the conditions of the casting and leaching steps. Because the polypropylene segments in the PP—OH are co-crystallized with polypropylene and because the hydroxy groups in the PP—OH are free and are exactly positioned at the interface between the PP phase and the additive phase, the hydroxylated polypropylene is located at the surfaces in the leached membrane, including the surfaces of the pores.

In general, membranes (including porous films) prepared in accordance with the above casting and leaching technique have adequate mechanical strength for long term usage in various separation processes. However, when still further mechanical strength is desired, it is possible to strengthen the film and membrane structures by supporting them on reinforcing materials, such as glass fiber fabrics, stainless steel fabrics and nonwoven or woven fabrics made of polymer materials, etc. In these cases, the reinforcing material becomes part of the matrix in the membrane structure.

The membranes of the present invention are useful in many separation applications. The membranes not only offer high flux and high retention of substances in the separation process, but also significantly improve anti-fouling capability which is very important in long term usage of PP membranes. The improvement is clearly attributed to the hydrophilicity of the membranes of the present invention.

DETAILED DESCRIPTION OF THE INVENTION

Figure 1:
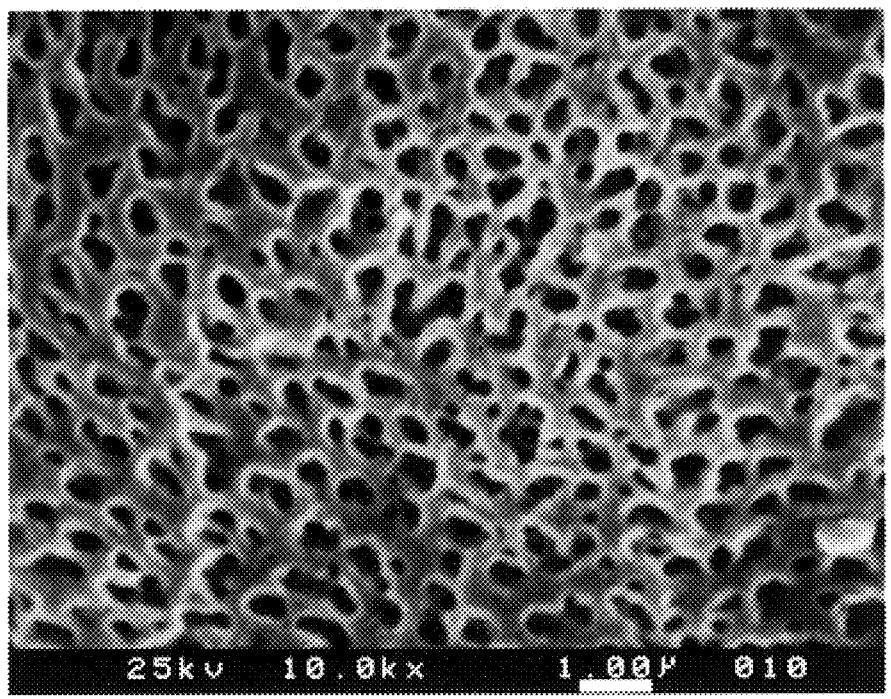
FIG. 1 is a scanning electron microscopy (SEM) micrograph of the asymmetric PP—OH/PP porous membrane of Example 2, illustrating that portion of the membrane which contacted the TEFLON(polytetrafluoroethylene) casting surface during the membrane casting and forming steps.

In accordance with the present invention, hydrophilic polypropylene membranes, including both symmetric and asymmetric structures, have now been discovered as being extremely useful in the separation field, both in terms of the efficiency (selectivity and flux) of the membranes and in terms of their useful life. The membranes can be in the form of a dense or porous polypropylene film having functional groups on its surfaces, including pore surfaces. A wide range of structures and pore sizes can be obtained. For example, the structures may be in the form of a dense film in which pores cannot be observed by a scanning electron microscope. Alternatively, the structures can be in the form of a porous membrane wherein the pores have an average diameter up to about 20 $\mu$m. In a preferred aspect of the invention, the structures comprise pores which range from being too small to be observed by a scanning microscope to pores having an average diameter up to about 1 $\mu$m.

In one preferred aspect of the invention, the hydrophilic polypropylene membranes comprise a film of functionalized polypropylene, such as hydroxylated polypropylene (PP—OH), with functional groups located on the surfaces of the film, including the pore surfaces. The functionalized polypropylene may be prepared as described by T. C. Chung and D. Rhubright in Macromolecules 24, 970, (1991) and in Macromolecules 26, 3019, (1993). More specifically, the functionalized polypropylene may be prepared by Ziegler-Natta copolymerization of propylene and borane monomer, such as 5-hexenyl-9-boro-bicyclo[3,3,1]nonane (5-hexyl-9-BBN). In general, the borane monomer can be incorporated into the polyolefin polymers with controllable concentrationsand locations. In turn, the borane groups in copolymers are easily converted to various functional groups despite heterogeneous reaction conditions. In a typical reaction, the more reactive propylene is added gradually in order to keep its concentration lower than that of the borane monomer. The propylene is added in decreasing amounts to account for the consumption of borane monomer in the feed. This approach can produce copolymers having a narrow compositional distribution and a higher yield of borane monomer. The viscosity average molecular weight (Mv) of the copolymers prepared by this technique can be determined by measuring their intrinsic viscosity using a cone/plate viscometer at 135° C. in decalin solution. To enhance the solubility of the copolymers, they may be esterified with benzyl chloride. The viscosity average molecular weight (Mv), which generally will exceed about 30,000, and which typically will range from about 30,000 to about 1,000,000, for example, from about 50,000 to about 300,000, is calculated using the Mark-Houwink equation:

$$[\eta]_0 = (K(M_V))^a$$

where K is $11.0 \times 10^{-3}$ (ml/g) and a is 0.80.

Due to the reactivity difference between the propylene and borane monomers, a brush-like microstructure is obtained during copolymerization as shown below:

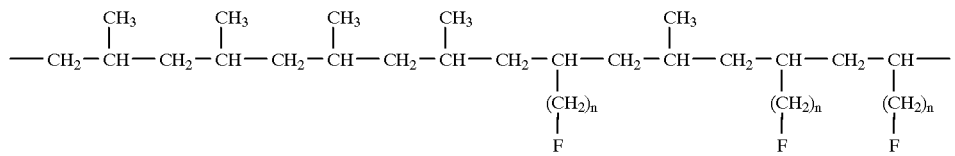

wherein F represents a functional group, such as OH, —NH$_2$, —COOH, or mixtures thereof, obtained from the interconversion of a borane group, and wherein n is an integer having a value of at least 3, preferably between 3 and about 10. The consecutive sequences of propylene units in the polymer backbone contributed by the functionalized poly-propylene component form crystalline phases by themselves and also cocrystalize with pure isotactic polypropylene contributed by the polypropylene component. On the other hand, the mobile functional groups, located at the end of side chains and concentrated toward the end of the polymer backbone, are expelled out to the surface of the crystalline phase. The high surface area and mobility of the functional groups offer important advantages in membrane separation applications.

In the preparation of the membranes, a solution casting process generally is employed. This process begins with a mixture of polypropylene (PP) and functionalized polyproplene (PP—F), such as hydroxylated polypropylene (PP—OH) having from about 0.3 to about 10 mole % of hydroxy groups, dispersed in a suitable solvent, such as xylene, trichlorobenzene or the like. The weight ratio of PP/PP—F typically is between about 1:1 to about 555:1. Preferably, the ratio is from about 1:1 to about 50:1, and more preferably from about 1:1 to about 20:1. One or mote fugitive additives, i.e., an additive which is water-soluble or which is soluble in a solvent that is a nonsolvent for PP—F/PP, are also added to the mixture. Suitable fugitive additives include polar hydrophylic materials, such as polyethylenegylcol (PEG) having a molecular weight of from about 200 to about 30,000, and preferably from about 800 to about 20,000, polyvinylpyrrolidone (PVP) having a molecular weight of from about 1,000 to about 30,000, and preferably from about 5,000 to about 15,000, phenol or the like. The nature and quantity of the fugitive additives influence the size of the pores and the surface hydrophilicity of the membranes being produced.

The mixture of solvent, PP—F, PP and the fugitive additives is heated to a temperture on the order of from about 150° C. to about 200° C., for example, 170° C., with stirring to form a homogeneous solution. The solution is then cast on a support or casting surface, such as a TEFLON (polytetrafluoroethylene) plate. In a preferred aspect of the invention, the casting surface is preheated to a temperature of from about 50° C. to about 200° C., typically about 80° C. to about 100° C. As soon as the solution has been cast onto the casting surface, the solvent in the mixture b to evaporate. During this initial period of solvent evaporation, which may be referred to as the "pre-evaporation" period, the initially homogeneous solution starts to gel. After the pre-evaporation period, the solvent remaining in the gel (or film) is completely evaporated either at room temperature or at a controlled elevated temperature, typically from about 50° C. to about 200° C., for example, from about 80° C. to about 100° C. The film that has formed is then immersed into a hot water bath (or into a bath which is a solvent for the fugitive additives but a nonsolvent for the polypropylene matrix of the film) to remove the additives therefrom. In the case where PEG and/or PVP is used as the fugitive additive, the immersion step is performed in a water bath maintained at a temperature of from about 50° C. to about 70° C., typically at about 60° C., for a period of at least about 12 hours, and preferably for at least 1 day; whereas in the case where phenol is the additive to be removed, the immersion typically takes place in a methanol bath maintained at a temperature above about 35° C., and preferably above about 40° C., e.g., 45° C. for a period of at least about 12 hours, and preferably for at least 1 day. Preferably, the hot water or methanol is freshened every hour or so in order to facilitate the extraction of the additives. After extracting the pore-forming additives, the film (now a membrane) can be used in a separation application, such as microfiltration or ultrafiltration, without undergoing any further treatment Alternatively, the film can be stored, preferably in a bath of distilled water, until it is ready for use.

The resultant membranes may have a symmetric structure comprising pores of a generally uniform size, or an asymmetric structure which consists of a dense surface layer and a rather porous support layer. The pore size distribution in the membranes can be controlled by controlling the identity and amount of the pore-forming agent(s), and by controlling the pre-evaporation, evaporation, cooling and extraction conditions.

As described above, the method of the present invention is characterized by its ability to prepare hydrophilic polypropylene membranes owing to the use of functionalized polypropylene and fugitive pore-forming additives. According to this method, it is possible to prepare both symmetric and asymmetric hydrophilicpolypropylene separations membranes which have controllable molecular weight (Mw) cut-off properties. In other words, by appropriately selecting the pore forming additives and by appropriately controlling the various process parameters, for example, the pre-evaporation period and/or the evaporation and cooling rates and/or the extraction temperature, and/or the ratio of polypropylene to functionalized polypropylene in the casting solution, and/or the amount of pore forming additives, etc., hydrophilic polypropylene membranes having separation cut-off properties ranging from low molecular weight substances, such as urea, to high polymers, such as dextran having molecular weight of about 75,000 g/mole, can be prepared.

The asymmetric membranes of the present invention typically have a thickness of from about 10 to about 250 μm, for example, from about 20 to about 200 μm, and comprise a dense surface layer and a rather porous support layer. On the dense surface layer, the pores are generally uniform and can be obtained with a size ranging from those which can not be observed by a scanning electron microscope (SEM) i.e., completely dense, to those having an average diameter of about 1 μm . The pore size in the porous support layer gradually increases from the proximal surface (nearest the dense layer) to the distal surface (the surface most remote from the dense layer). Pores having an average diameter as high as about 20 μm generally can be observed on the porous distal surface.

In general, the membranes (including porous structures) which are prepared in accordance with the present method pots adequate mechanical strength for long term use in various separation applications. However, for applications where additional mechanical strength is desired, it is possible to further strengthen the membranes by combining them with reinforcing materials, such as glass fiber fabrics, stainless steel fabrics and nonwoven or woven fabrics made of polymer materials, etc. In these cases, the membrane-forming polymer solutions are coated on the reinforcing materials such that some of the functional polypropylene serves as an interfacial bonding agent and providesstrong adhesion between the polymer matrix and reinforcing materials. The resultant membranes are composite structures in which the mechanical properties are provided primarily by the reinforcing materials, while the permeability and selectivity (cut-off properties) are determined primarily by the composition of the polymer coating solution and the herein described method for preparing the composite structures.

The membranes of the present invention typically have a water permeability of from about 0.01 to about 200 l/m² .hr under a pressure of 2 Kg/cm², and the contact angles on the surface of the membranes typically are on the order of from about 70° to 85°. As indicated above, the functional groups are located at the surface portions of the membranes including the surface of the pores. This latter characteristic of the present membranes can be confirmed by chemically reacting the functional groups with an appropriate reagent under heterogeneous reaction conditions. For example, in the case where the functional groups are hydroxy groups, the hydroxy groups may be reacted with ethyl aluminum dichloride (EtAlCl$_2$) to form oxy aluminum dichloride (—O—AlCl$_2$) species. When this is done, it has been found that most of the hydroxy groups are available to react with the EtAlCl$_2$, thus clearly indicating the location of functional groups on the surfaces of membranes. The reason why the functional groups locate themselves on the surfaces of the membranes, including the pore surfaces, is because there is a chemical affinity between the functional groups and the fugitive pore forming additives.

The functionalized polypropylene membranes of the present invention are characterized by commercially desirable chemical, mechanical and thermal properties, and by an ability to separate substances when used in a variety of filtration processes, including microfiltration, ultrafiltration and dialysis processes. The desirable properties of the functionalized membranes may be illustrated by measuring, for example, the membranes solute permeability coefficient, % rejection, mechanical strength, contact angle and stability in long term use.

The solute permeability coefficient (P), expressed in terms of cm³.cm/cm².sec, can be calculated by following equation:

$$P = \frac{-d}{A(1/V_1 + 1/V_2)t} \times \ln\left[(1 + V_1/V_2)\frac{C_t}{C_0} - \frac{V_1}{V_2}\right]$$

where $V_1$ is the volume of the concentrated compartment in cm³, $V_2$ is the volume of the dilute compartment in cm³, A is the membrane area in cm², d is the membrane thickness in cm, $C_o$ is the concentration of the concentrated compartment at time zero and $C_t$ is the concentration of the concentrated compartment at time t.

Water permeability (liter/m².hr.atm) determines the filtration rate through the membrane per unit area and time under pressure.

The rejection (%) is calculated by following equation:

$$\text{Rejection (\%)} = \left[1 - \frac{\text{Permeate solute concentration}}{\text{Retentate solute concentration}}\right] \times 100$$

Molecular weight cut off is the molecular weight (Mw) at which at least 90% of a solute of that Mw is retained by a membrane.

Contact angle (degrees) is determined by ten water points on each membrane surface. The measurement is made directly on the sessile water drops with the use of a Rame Hart telescope goniometer. The sessile water drops must have a diameter of at least 4 mm in order to eliminate or at least minimize the size of the water drops from influencing the measurement of the contact angle.

The tensile strength (MPa) of the membranes is determined according to ASTM D 1708 -84 using an Instron model 4201 lab top tester with a 1 KN load cell. The following examples illustrate the present invention without, however, limiting the same hereto.

EXAMPLE 1

Synthesis of Hydroxylated Polypropylene (a) Copolymerization of Propylene and Hexenyl-9-BBN in Continuous Reaction In a typical run, 15.477 g of 5-hexenyl-9-BBN and 200 ml of hexane were placed in an argon filled Parr stirred pressure reactor and sealed. Propylene (12 g) was added under $N_2$ pressure. A slurry of 1.027 g of aluminum activated titanium trichloride (TiCl$_3$AA) and 4.705 g of diethyl aluminum chloride (Et$_2$Al Cl) in 80 ml of toluene was then added under $N_2$ pressure to catalyze the copolymerization. Additional propylene was added at 30 minute intervals with 10, 8, 6 and 5 g of propylene added respectively. After the last monomer charge, the reaction ran for additional 1 hour before being terminated by injection of 100 ml of isopropanol (IPA). The reaction was stirred for an additional ½ hour before venting the excess pressure and further purification with IPA. The procedure was repeated with the reaction time and the mole % of B in the feed being varied. The results of this example (four runs) are summarized in Table I. The process of this example produced copolymers having a narrow compositional distribution and high yield of borane monomer.

TABLE I

The Summary of Copolymerization of α-Olefin and Boran Monomer by Continuous Reaction

| Polymer | Mole % B* in Feed | Mole % B in Copolymer | Reaction Time (hr.) | Yield (%) |
|---|---|---|---|---|
| PP-B | 10 | 3.5 | 3 | 62 |
| PP-B | 10 | 4.2 | 5 | 75 |
| PP-B | 13 | 5.0 | 3 | 65 |
| PP-B | 13 | 7.8 | 5 | 72 |

* = 5-hexenyl-9-BBN (b) Oxidation Reaction

The indicated boron group-containing polymers (PP—B), together with 700 ml of tetrahydrofuran (THF), were placed in a 2000 ml round bottom reactor equipped with septum and stirrer. The contents of the reactor were mixed to form an inhomogeneous slurry. A solution of 19 g of NaOH in 100 ml of water was degassed and added dropwise into the slurry in the reactor. There actor was then cooled to 0° C. before slowly adding 87.6 g of degassed 30% $H_2O_2$ solution via a double tipped needle. The resulting reaction was allowed slowly to come to room temperature before the reactor contents were heated at 55° C. for 6 hours. The resulting hydroxylated polymer was then precipitated in water, squeeze dried, and slurried in 500 ml of methanol. After 3 hours of vigorous stirring, approximately 75 ml of MeOH were distilled under $N_2$ to remove a boric acid-methanol azeotrope. The polymer was then precipitated in water, squeeze dried, washed with acetone, and dried under a high vacuum at 45° C.

Table II summarizes the resulting functionalized polypropylene. The molecular weight of polymers was determined by intrinsic viscosity which was measured in a cone/plate viscometer at 135° C. in decalin solution. To enhance the solubility of polymers, the hydroxylated polymers were esterified with benzoyl chloride. The viscosity average molecular weight (Mv) was calculated using the Mark-Houwink equation.

TABLE II

The Summary of Copolymerization of α-Olefin and borane Monomer by Continuous Reaction

| Polymer | mole % B* in Feed | mole % OH in Polymer | Melting Point (° C.) | Heats of Fusinon (J/g) | η** | Mv (g/mole) |
|---|---|---|---|---|---|---|
| PP | 0 | 0 | 163 | 62.5 | 2.07 | 230,000 |
| PP-OH | 10 | 3.5 | 161 | 54.1 | 1.78 | 183,000 |
| PP-OH | 13 | 5.0 | 158 | 44.6 | 1.71 | 174,000 |

*B = 5-hexenyl-9BBN
**η = intrinsic viscosity

As shown in Table II Mv's are high, about 200,000 g/mole, for all samples. The lack of significant change in the molecular weight due to the addition of the borane monomer is quite interesting, especially under heterogeneous reaction conditions. No catalyst poisoning by the borane group is indicated. In addition, the solubility of the borane groups offers the same reaction conditions as an α-olefin in homopolymerization. The crystallinities of functionalized PP polymers, shown by melting point and heat of fusion, are not much different from that of PP homopolymer, which is due to a brush-like structure of the functionalized polypropylene. The functional groups in the side chains are concentrated at the end of polymer chain, therefore, the polypropylene units have consecutive sequence to form crystalline phases.

EXAMPLE 2

Preparation and Evaluation of PP—OH/PP Membrane (a) Preparation of PP—OH/PP Asymmetric Membrane The PP—OH sample prepared in Example 1 (3.5 mole % of hydroxy groups and Mw=183,000 g/mole) and PVP (Mw=10,000 g/mole) in xylene at 170° C. with a weight ratio of PP—OH:PP:PEG:PVP:xylene of 4:4:1:1:520. The mixture was stirred at 170° C. until the mixture became a homogeneous solution. The solution was poured onto a preheated Teflon plate (kept at 90° C.) and was spread in a thin film using a casting bar with a spacer. The solvent was allowed to preevaporate until a gel film was obtained. The gel film was cooled to room temperature and was completely dried under room temperature and humidity. The resulting film was immersed into a bath of hot water (80° C.) for 5 days to remove PEG and PVP. The hot water was exchanged for fresh hot water every hour to facilitate the extraction of the PEG and PVP. The resultant film, now a membrane, was stored in a distilled water bath before measuring its performance properties. The contact angle of active skin layer of the membrane was found to be 77°±3°, due to the hydroxy groups on the surface of the membrane, and tensile strength was found to be 3.4 Mpa.

Figure 2:
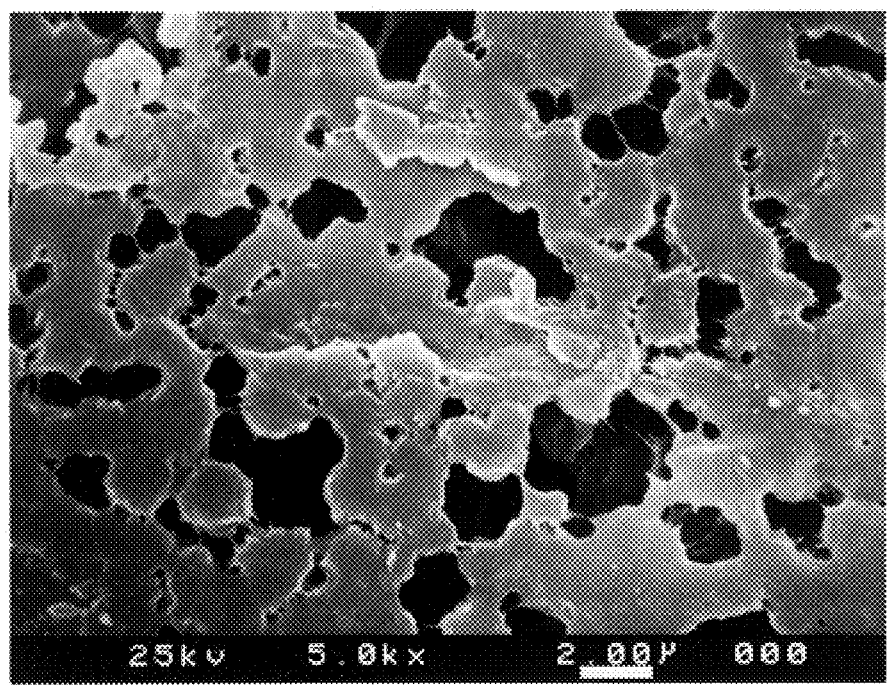
FIG. 2 is a SEM micrograph of the asymmetric PP—OH/PP porous membrane of Example 2, illustrating that portion of the membrane which was exposed to air during the membrane forming process.

By scanning electron microscopic (SEM) observation, it was found that the membrane had an asymmetric structure composed of a skin layer having pores less than 0.7 μm in size and a porous support layer. The thickness of the membrane was about 100 μm. The contact angle of active skin layer of the membrane was found to be 77°±3°, due to the hydroxy groups on the surface of the membrane, and tensile strength was found to be 3.4 MPa. An SEM micrograph of the membrane is shown in FIGS. 1 and 2.

(b) Evaluation of PP—OH Membrane

The membrane was tested for ultrafiltration performance at 25° C. with the pressure of 2 $Kg/cm^2$. The concentration of solute was about 2000 ppm in water. As shown in the Table III, three solutes, including water,. polyethylene glycol and dextran with various molecular weights were examined. The experimental results clearly show good selectivity, based on the molecular weight, and relatively high flux. In addition, the membrane exhibited excellent stability, both flux and % rejection, during the prolonged separation process. In fact, all of the results in Table III were obtained using the same PP—OH membrane.

TABLE III

The Results of Ultrafiltration Using PP-OH Membrane

| Solute | Molecular Weight | Flux ($1/m^2 \cdot hr$) | Rejection (%) |
|---|---|---|---|
| PEG | 600 | 24.1 | 0 |
| PEG | 1,000 | 23.5 | 3 |
| PEG | 7,500 | 18.8 | 22 |
| PEG | 20,000 | 12.6 | 96 |
| Dextran | 10,000 | 13.2 | 62 |
| Dextran | 40,000 | 11.5 | 89 |
| Dextran | 75,000 | 7.8 | 99 |
| Water | 18 | 45.0 | 0 |

EXAMPLE 3

Preparation and Evaluation of PP—OH/PP Membrane

The procedure described in Example 2 was followed, except that the homogeneous solution of PP—OH PP, PEG and PVP in xylene was cast on a TEFLON (polytetrafluoroethylene) plate at room temperature. By scanning electron microscopic observation, it was found that the membrane had an asymmetric structure composed of a dense and rough active skin layer and a highly porous support layer, and that the thickness of the membrane was about 120 μm. The contact angle of active skin layer of the membrane was found to be 79°±5° and the tensile strength was found to be 1.3 MPa.

The membrane was tested for ultrafiltration performance in the same manner as in Example 2. The water flux was over 150 l/m².hr., but the rejection ability for standard solute solution and mechanical strength were very low. It was determined that the minimum thickness of the active skin layer, which is necessary for the membrane to possess adequate mechanical properties, was not formed without the TEFLON(polytetrafluoroethylene) plate having ben preheated. It was also found that most of solvent remained in the membrane during coagulation at room temperature, such that the density of polymer in the membrane matrix was low. Therefore, it was concluded that the preheating of the TEFLON(polytetrafluoroethylene) plate preferably should be adopted as a part of this invention.

EXAMPLE 4

Preparation and Evaluation of PP—OH/PP Membrane

Following the procedure described in Example 2(a), the homogeneous solution was cast on a TEFLON (polytetrafluoroethylene) plate kept at 90° C. The surface of the solution facing air (facing away from the TEFLON (polytetrafluoroethylene) was exposed to air until a thin gel layer was formed on the exposed surface. The solution (and thin gel layer) was then covered with a glass plate to provide a controlled, slow evaporation and cooling. After a completely gelled film was obtained, the film was dried at room temperature and humidity.

Figure 3:
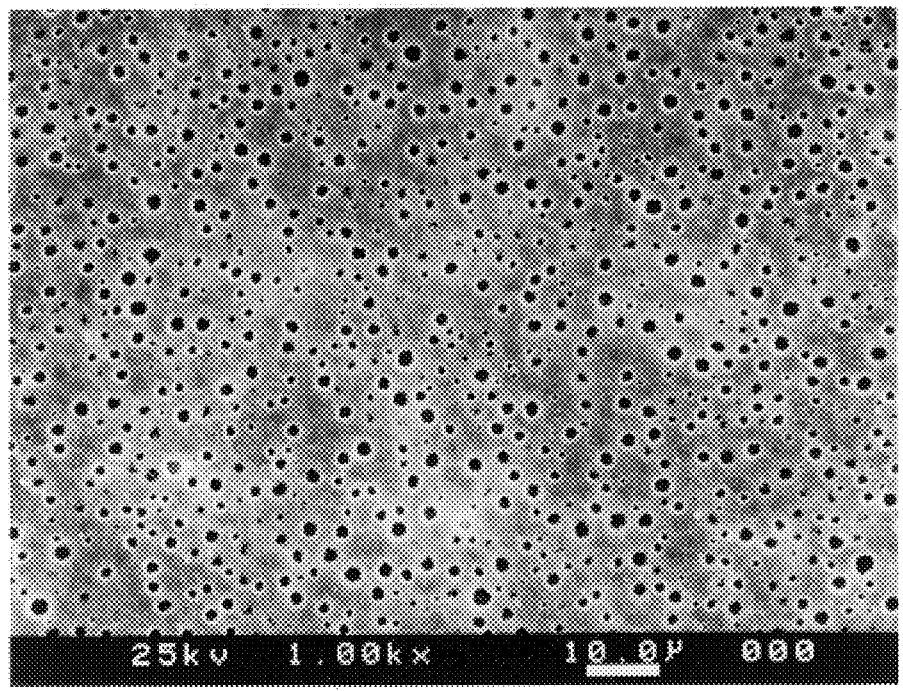
FIG. 3 is a SEM micrograph of the asymmetric PP—OH/PP porous membrane of Example 4, illustrating that portion of the membrane which contacted the Teflon casting surface during the membrane casting and forming steps.
Figure 4:
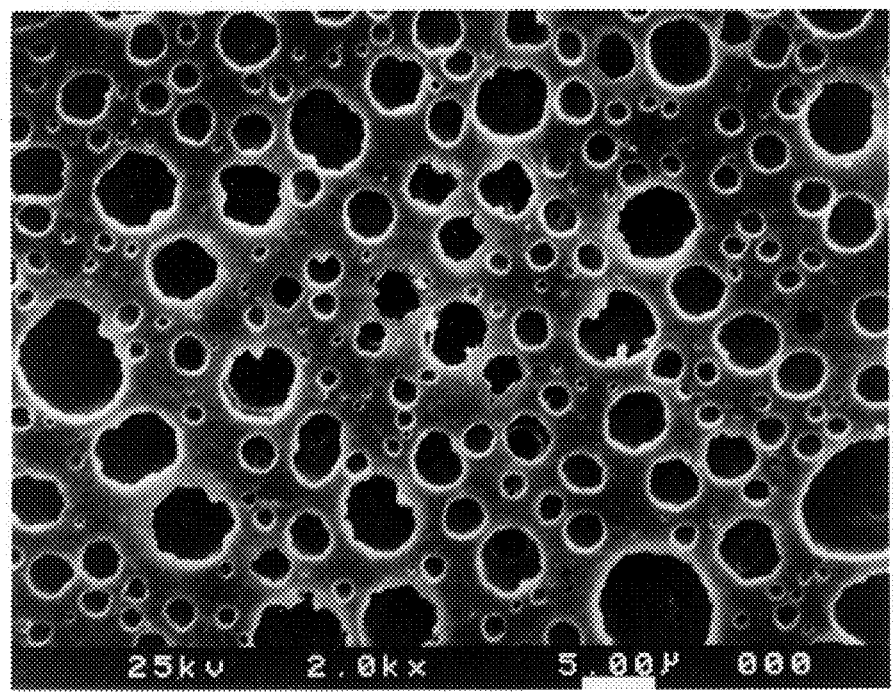
FIG. 4 is a SEM micrograph of the asymmetric PP—OH/PP porous membrane of Example 4, illustrating that portion of the membrane which was exposed to air during the membrane forming process.

The resulting membrane was examined by scanning electron microscopy (SEM). As shown in FIG. 3 and 4, an asynmetric porous membrane was obtained. The membrane had an active skin layer on the surface contacting the TEFLON(polytetrafluoroethylene) plate and a support layer having relatively larger pores on the surface exposed to air. The pore diameters on the active skin layer were less than 1 μm, whereas the pores in the support layer that was exposed to air were considerably larger, i.e., as large as about 8μm. The support layer consisted of large, porous spherulites. The thickness of the membrane was about 90μm. The contact angle of active skin layer of the resultant membrane was 82°±2° and the tensile strngth thereof was 4.8 Mpa.

The membrane was tested for ultrafiltration performance (Table IV) in the same manner as in Example 2.

TABLE IV

The Results of Ultrafiltration Using PP-OH Membrane

| Solute | Molecular Weight | Flux (1/m² · hr) | Rejection (%) |
| --- | --- | --- | --- |
| PEG | 1,000 | 20.3 | 0 |
| PEG | 7,500 | 19.2 | 5 |
| PEG | 20,000 | 12.2 | 97 |
| Dextran | 10,000 | 12.8 | 68 |
| Dextran | 40,000 | 8.7 | 95 |

TABLE IV-continued

The Results of Ultrafiltration Using PP-OH Membrane

| Solute | Molecular Weight | Flux (1/m² · hr) | Rejection (%) |
| --- | --- | --- | --- |
| Dextran | 75,000 | 6.5 | 98 |
| Water | 18 | 23.2 | 0 |

EXAMPLE 5

Preparation and Evaluation of PP—OH/PP Membrane

PP—OH, PP, phenol (Mw=94 g/mole) and xylene, in a weight ratio of 1:1:2:98 were mixed at 170° C. The mixture was then stirred at 170° C. until a homogeneous solution was obtained. The solution was then cast on a Teflon plate kept at 90° C. and was spread with a casting bar equipped with a spacer. The solvent was allowed to evaporate completely at this temperature. The resulting film was then immersed in a bath of methanol (maintained at about 45° C.) for 5 days to remove the phenol. The methanol bath was changed every 3 hours to facilitate the phenol extraction. The resulting film (now a membrane) was stored in a distilled water bath before measuring its properties.

Figure 5:
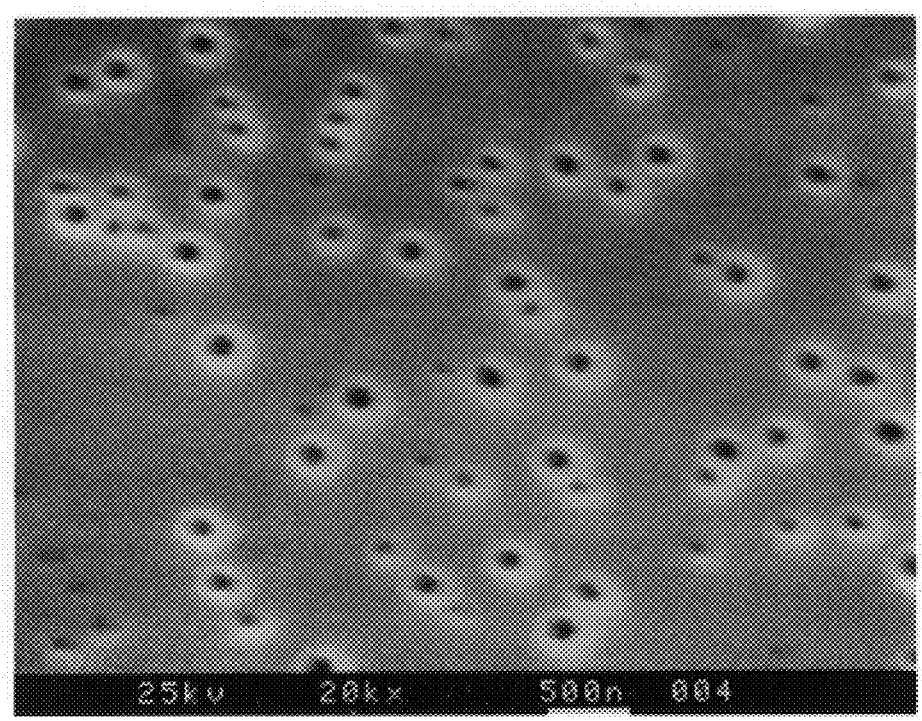
FIG. 5 is a SEM micrograph of the asymmetric PP—OH/PP porous membrane of Example 5, illustrating that portion of the membrane which contacted the Teflon casting surface during the membrane casting and forming steps.
Figure 6:
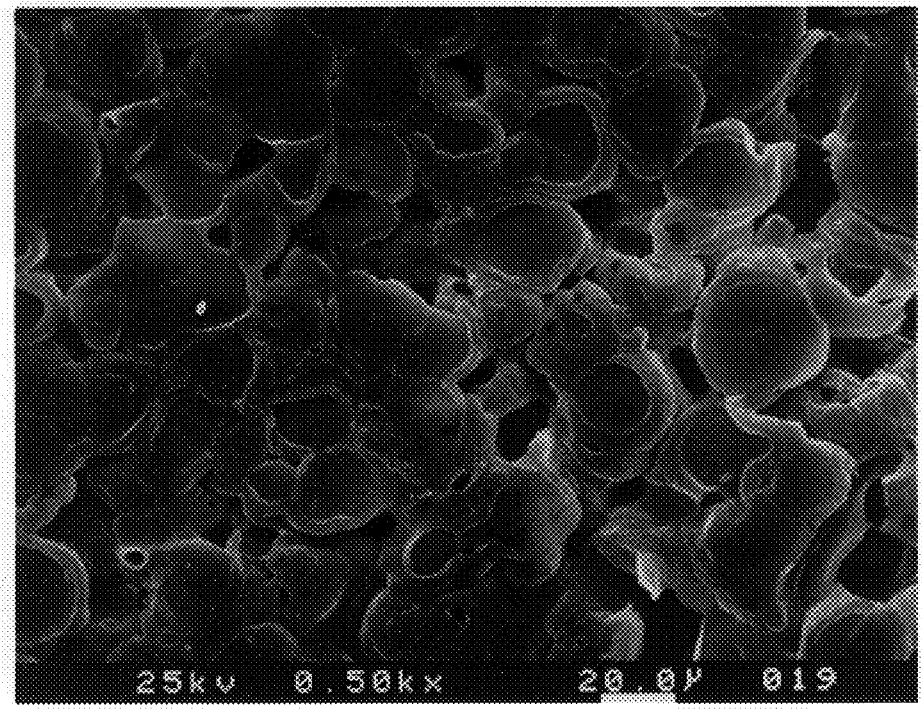
FIG. 6 is a SEM micrograph of the asymmetric PP—OH/PP porous membrane of Example 5, illustrating that portion of the membrane which was exposed to air during the membrane forming process.

By SEM observation, it was found that the membrane had an assymetric structure composed of a skin layer having pores of less than about 0.1 μm in diameter and a porous support layer. The thickness of the membrane was about 80 μm the contact angle of the active skin layer was 79°±5° and the tensile strength was 7.5 MPa. An SEM micrograph of the surface of the membrane which contacted the TEFLON (polytetrafluoroethylene) plate during membrane formation is shown in FIG. 5, whereas an SEM micrograph of the surface of the porous support layer facing air (away from the TEFLON(polytetrafluoroethylene) plate) during the membrane formation is shown in FIG. 6.

The membrane was tested for ultrafiltration performance in the same manner as in Example 2. The results are shown in Table V. The rejection molecular weight was much lower than for the membrane prepared in accordance with Example 2, due to smaller diameter of the pores in active layer of the present membranne. Only a single membrane was prepared according to this example, and that membrane was used to obtain all of the performance data shown in Table V. This demonstrates that the membranes of the invention can be used repeatedly without causing significant changes in their properties (rejection (%) and flux) and without causing detectable morphological changes in pore size and shape.

TABLE V

The Results of Ultrafiltration Using PP-OH Membrane

| Solute | Molecular Weight (Mw) | Flux (1/m² · hr.) | Rejection (%) |
| --- | --- | --- | --- |
| PEG | 200 | 6.2 | 0 |
| PEG | 600 | 5.3 | 8 |
| PEG | 1,000 | 3.8 | 40 |
| PEG | 7,500 | 2.1 | 91 |
| PEG | 20,000 | 1.7 | 96 |
| Dextran | 10,000 | 1.8 | 89 |
| Dextran | 40,000 | 1.5 | 95 |

TABLE V-continued

The Results of Ultrafiltration Using PP-OH Membrane

| Solute | Molecular Weight (Mw) | Flux (1/m² · hr.) | Rejection (%) |
|---|---|---|---|
| Dextran | 75,000 | 1.1 | 98 |
| Water | 18 | 7.5 | 0 |

EXAMPLE 6

Preparation and Evaluation of PP—OH/PP Membrane

PP—OH, PP, PEG (Mw=1,000 g/mole), PVP (Mw=10,000 g/mole) and xylene, in a weight ratio of 4:4:1:2:525, were mixed together at 170° C. The mixture was stirred at 170° C. until a homogeneous solution was obtained and the solution was cast on a TEFLON(polytetrafluoroethylene) plate maintained at 90° C. The solvent was allowed to evaporate completely at this temprature. The resulting film was immersed into a bath of hot water (80° C.) for 5 days to remove PEG and PVP. The hot water was exchanged for fresh hot water every hour to facilitate the extraction of the PEG and PVP. The resultant film, now a membrane, was stored in a distilled water bath before measuring its performance properties.

By SEM observation, it was found that the structure of the membrane consisted of spherical large pores on both the surface that contacted the TEFLON (polytetrafluoroethylene) plate during membrane formation and on the surface exposed to air. The membrane cross section also contained similar large pores. The pores on both surfaces and throughout the cross section of the membrane were of about 1 μm in diameter. The thickness of the membrane was about 40μm. The contact angle of the active skin layer was 78°±3° and the tensile strength was 6.0 MPa.

When the membrane was tested for ultrafiltration performance in the same manner as in Example 2, the water flux was found to be greater than 80 l/m².hour, but the rejection ability for standard solute solution was low. The rejection (%) for PEG (Mw=20,000 g/mole) and Dextran (Mw=7,500 g/mole) were 47% and 51%, respectively. The results of this example indicate that the membrane could be used for microfiltration applications.

EXAMPLE 7

Preparation and Evaluation of PP—OH/PP Membrane

PP—OH, PP, PEG (Mw=1,000 g/mole) and xylene, in a weight ratio of 2:2:1:196, were mixed together at 170° C. The mixture was stirred at 170° C. until a homogeneous solution was obtained and the solution was cast on a TEFLON(polytetrafluoroethylene) plate maintained at 90° C. The solvent was allowed to preevaporate until a gel was obtained. The gel was cooled to room temperature and was completely dried (free from solvent) at room temperature and humidity. The resulting film was immersed into a bath of hot water (80° C.) for 5 days to remove PEG. The hot water was exchanged for fresh hot water every hour to facilitate the extraction of the PEG. The resultant film, now a membrane, was stored in a distilled water bath before measuring its performance properties.

Figure 7:
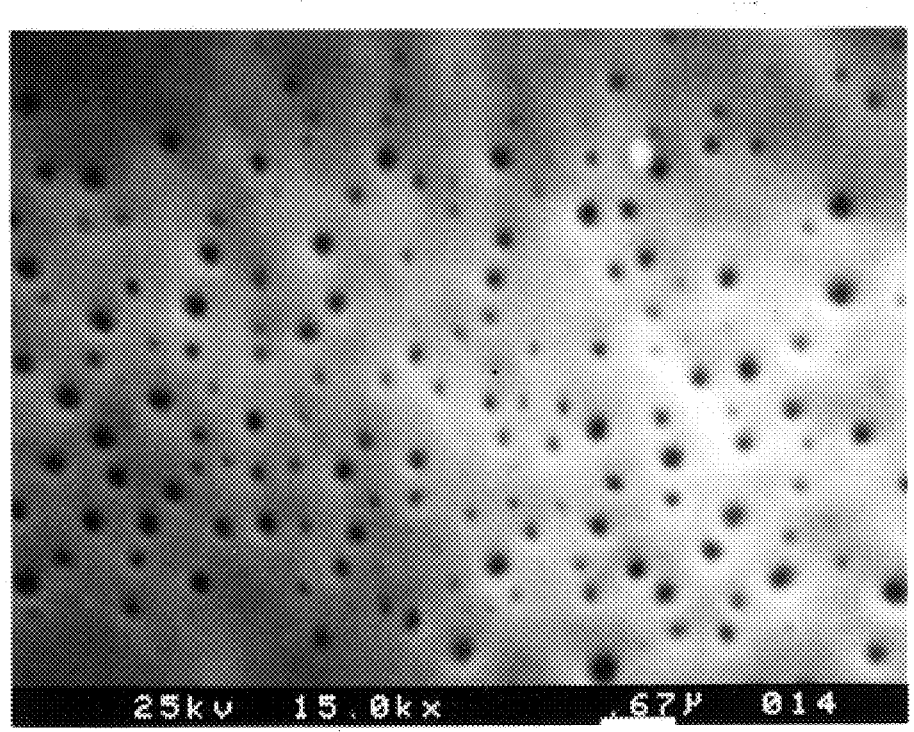
FIG. 7 is a SEM micrograph of the asymmetric PP—OH/PP porous membrane of Example 7, illustrating that portion of the membrane which contacted the TEFLON (polytetrafluoroethylene) casting surface during the membrane casting and forming steps.
Figure 8:
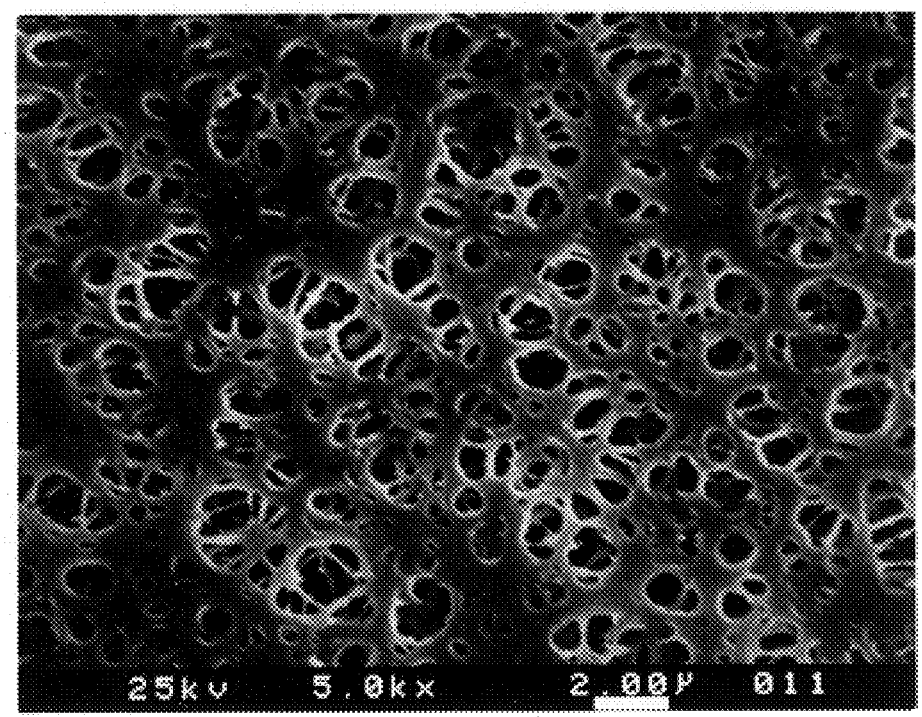
FIG. 8 is a SEM micrograph of the asymmetric PP—OH/PP porous membrane of Example 7, illustrating that portion of the membrane which was exposed to air during the membrane forming process.

By SEM observation, it was found that the membrane had an assymetric structure composed of a skin layer having pores ranging from about 0.13 to about 0.5 μm in diameter and a porous support layer having pores of about 1 to 2 μm in diameter. The thickness of the membrane was about 60 μm. The contact angle of the active skin layer was 79°±1° and the tensile strength was 13.2 MPa. An SEM micrograph of the surface of the membrane which contacted the Teflon plate during membrane formation is shown in FIG. 7, whereas an SEM micrograph of the surface of the porous support layer facing air (away from the TEFLON (polytetrafluoroethylene) plate) during the membrane formation is shown in FIG. 8.

The membrane was tested for ultrafiltration performance in the same manner as in Example 2. The results are shown in Table VI. The rejection molecular weight was found to be about 7,500 g/mole for PEG and about 10,000 g/mole for Dextran. It was also found that the membrane could be used repeatedly without detectable changes in rejection (%) and flux, and without detectable morphological changes in pore size and shape. Only a single membrane was prepared according to this example, and that membrane was used to obtain all of the performance data shown in Table VI. After obtaining all of the performance data shown in Table VI, the used membrane was reexamined by SEM study. The reexamination showed that the membrane had an almost identical morphology before and after long term use. This is attributable to the hydrphilicity of the membrane.

TABLE VI

The Results of Ultrafiltration Using PP-OH/PP Membrane

| Solute | Molecular Weight | Flux (1/m² · hr) | Rejection (%) |
|---|---|---|---|
| PEG | 200 | 6.7 | 0 |
| PEG | 600 | 6.2 | 5 |
| PEG | 1,000 | 5.2 | 42 |
| PEG | 7,500 | 2.0 | 89 |
| PEG | 20,000 | 1.2 | 95 |
| Dextran | 10,000 | 1.9 | 87 |
| Dextran | 40,000 | 1.6 | 93 |
| Dextran | 75,000 | 1.0 | 97 |
| Water | 18 | 8.9 | 0 |

EXAMPLE 8

Preparation and Evaluation of PP—OH/PP Dense Membrane

PP—OH, PP, Phenol (Mw=94 g/mole) and xylene, in a weight ratio of 1:1:1:98, were mixed at 170° C. to form a homogeneous solution. The solution was cast on a TEFLON (polytetrafluoroethylene) plate that was positioned in an oven to prevent the solution from contacting air during gellation. The TEFLON(polytetrafluoroethylene) plate and the cast solution were kept at 90° C. in the oven and all of the solvent was allowed to evaporate at that temperature. The resulting film was then immersed in a bath of methanol (maintained at about 45° C.) for 5 days to remove the phenol. The methanol bath was changed every 3 hours to facilitate the phenol extraction. The resulting film (now a membrane) was stored in a distilled water bath before measuring its properties.

Figure 9:
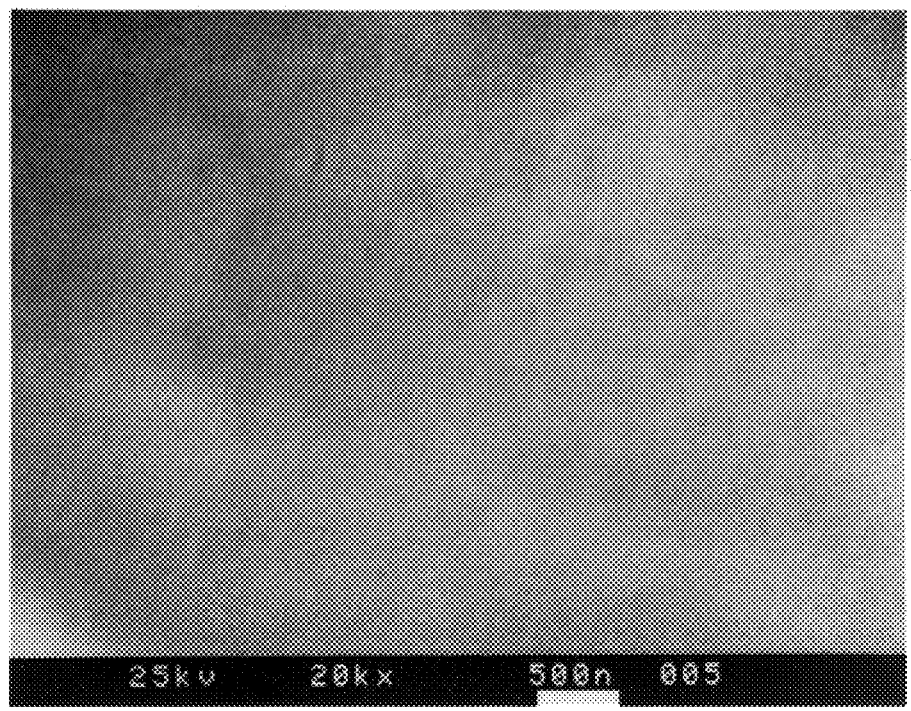
FIG. 9 is a SEM micrograph of the dense PP—OH/PP membrane of Example 8, illustrating that portion of the membrane which contacted the TEFLON (polytetrafluoroethylene) casting surface during the membrane casting and forming steps.
Figure 10:
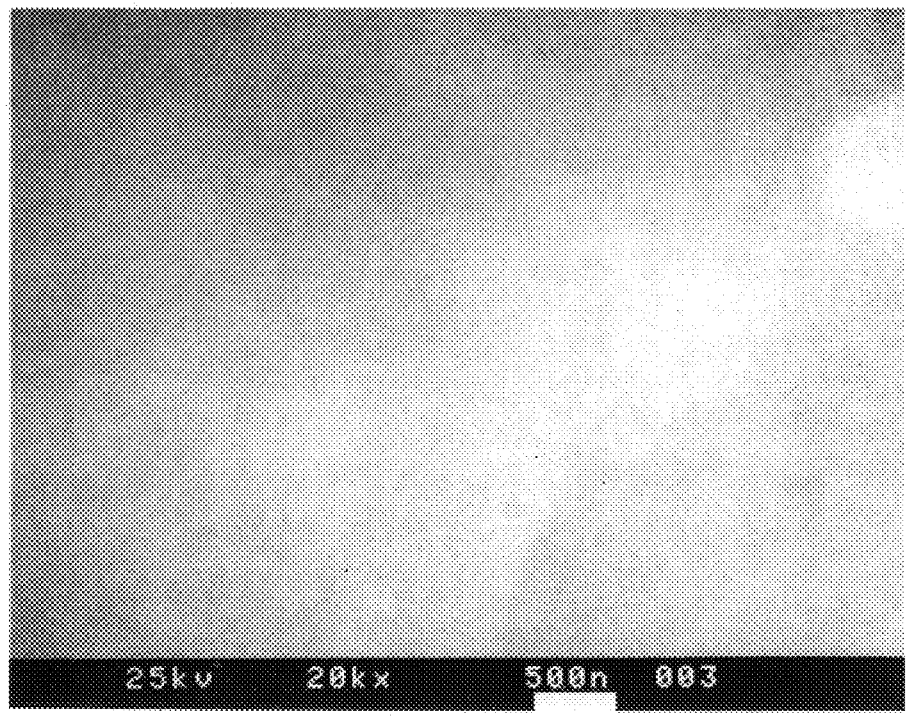
FIG. 10 is a SEM micrograph of the PP—OH/PP membrane of Example 8, illustrating that portion of the membrane which was exposed to air during the membrane forming process.
Figure 11:
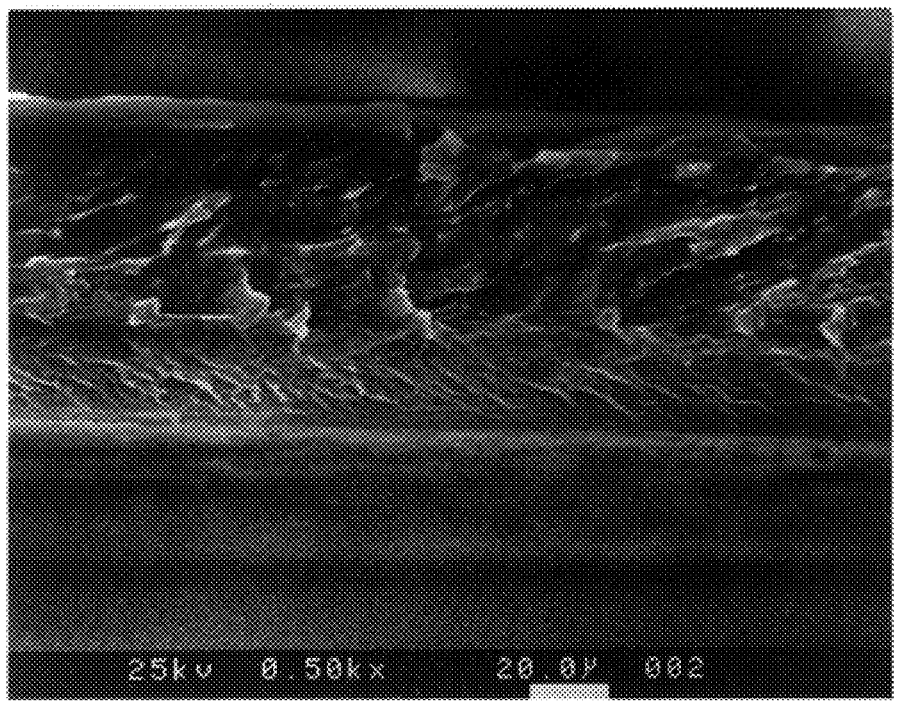
FIG. 11 is a SEM micrograph of the cross section of the PP—OH/PP of Example 8.

By SEM observation, it was found that the membrane had a highly dense structure on both of its surfaces and throughout its cross section. The thickness of the membrane was about 55 μm. The contact angle of the active skin layer was 80°±2° and the tensile strength was 15.7 MPa. An SEM micrograph of the surface of the membrane facing air (away from the TEFLON(polytetrafluoroethylene) plate) during the membrane formation is shown in FIG. 9, an SEM micrograph of the surface of the membrane which contacted the TEFLON(polytetrafluoroethylene) plate during membrane formation is shown in FIG. 10, and an SEM micrograph of the cross section of the membrane is shown in FIG. 11.

The membrane was tested for dialysis performance at solution temperature of 37° C. Solute concentration of urea, sucrose, Vitamin $B_{12}$ and PEG 3400 were 200, 200, 50 and 100 mg/l in water, respectively. The results are summarized in Table VII.

TABLE VII

The Results of Dialysis Using PP-OH/PP Dense Membrane

| Solute | Molecular Weight | Permeability Coefficient × $10^7$ ($cm^3 \cdot cm/cm \cdot sec$) |
|---|---|---|
| Urea | 60 | 10.9 |
| Sucrose | 342 | 3.6 |
| Vitamin $B_{12}$ | 1355 | 0.7 |
| PEG | 3,400 | 0.4 |

EXAMPLE 9

Preparation and Evaluation of PP—OH/PP Dense Membrane

PP—OH, PP and xylene (without hydrophilic additive), in a weight ratio of 1:1:98, were mixed at 170° C. to form a homogeneous solution. The solution was cast on a TEFLON (polytetrafluoroethylene) plate that was positioned in an oven to prevent the solution from contacting air during gellation. The TEFLON(polytetrafluoroethylene) plate and the cast solution were kept at 90° C. in the oven and all of the solvent was allowed to evaporate at that temperature. The contact angle of active skin layer of the resultant membrane was 101°±3° and tensile strength was 16.2 Mpa. When examined by SEM, no pores were observed either on the surface of the membrane or along a cross-section thereof. The thickness of the membrane was about 75 μm.

The membrane was tested for dialysis performance at solution temperature of 37° C. Solute concentration of urea, sucrose, Vitamin $B_{12}$ and PEG 3400 were 200, 200, 50 and 100 mg/l in water, respectively. The results are summarized in Table VII.

TABLE VIII

The Results of Dialysis Using PP-OH/PP Dense Membrane

| Solute | Molecular Weight | Permeability Coefficient × $10^7$ ($cm^3 \cdot cm/cm \cdot sec$) |
|---|---|---|
| Urea | 60 | 4.0 |
| Sucrose | 342 | 1.3 |
| Vitamin $B_{12}$ | 1355 | 0.3 |
| PEG | 3,400 | 0.1 |

EXAMPLE 10

Preparation of PP—OH/PP Composite Membrane

Polymer solutions having an appropriate composition can be coated on a porous reinforcing material, such as a glass fiber fabric, a stainless steel fabric or a nonwoven or woven fabric made of polymeric material. Strong adhesion between polymer matrix and reinforcing material is provided by functionalized polypropylene. The mechanical properties of composite are dictated primarily by the support materials.

One example of composite membrane was prepared by mixing PP—OH, PP, PEG (Mw=18,500 g/mole) and xylene, in a weight ratio of 3:3:1:994 at 170° C. until a homogeneous solution was obtained. The solution was cast on the surface a stainless steel reinforcing fabric which was located in an oven (maintained at 90° C.) to prevent the solution from contacting air. The solution and fabric were kept in the oven until all of the solvent was evaporated and the solution was converted into a gel film. The gel film was then immersed into a bath of hot water (80° C.) for 2 days to remove PEG. The hot water was exchanged with fresh hot water every hour to facilitate the PEG extraction. The resultant film, now a composite membrane comprised of a polymeric membrane bonded and thereby supported on the stainless steel reinforcing fabric, was stored in a distilled water bath before measuring performance.

Figure 12:
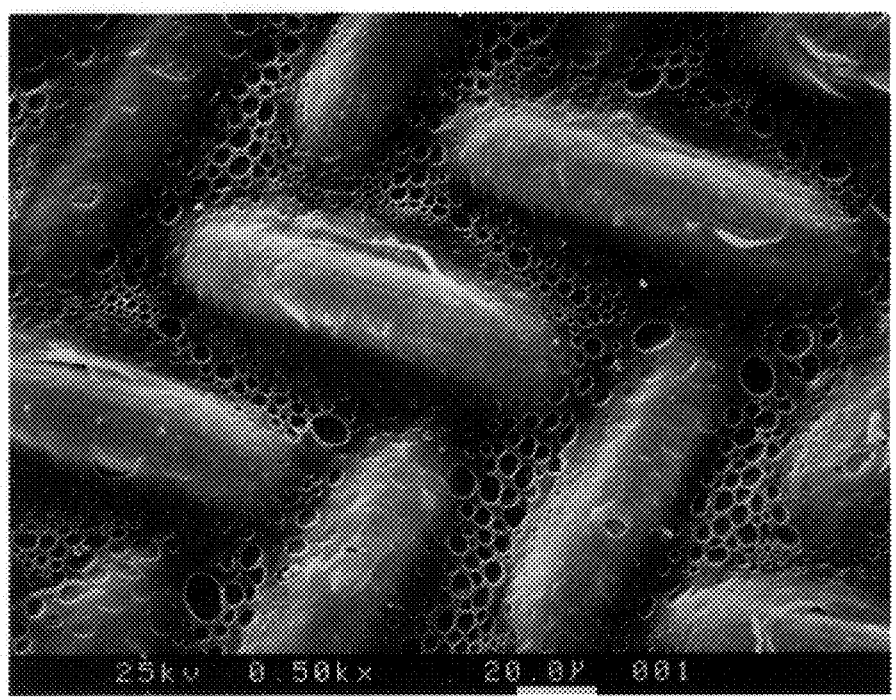
FIG. 12 is a SEM micrograph of the composite membrane of Example 10, illustrating the side of the stainless steel reinforcing fabric on which the PP—OH/PP coating solution was cast.
Figure 13:
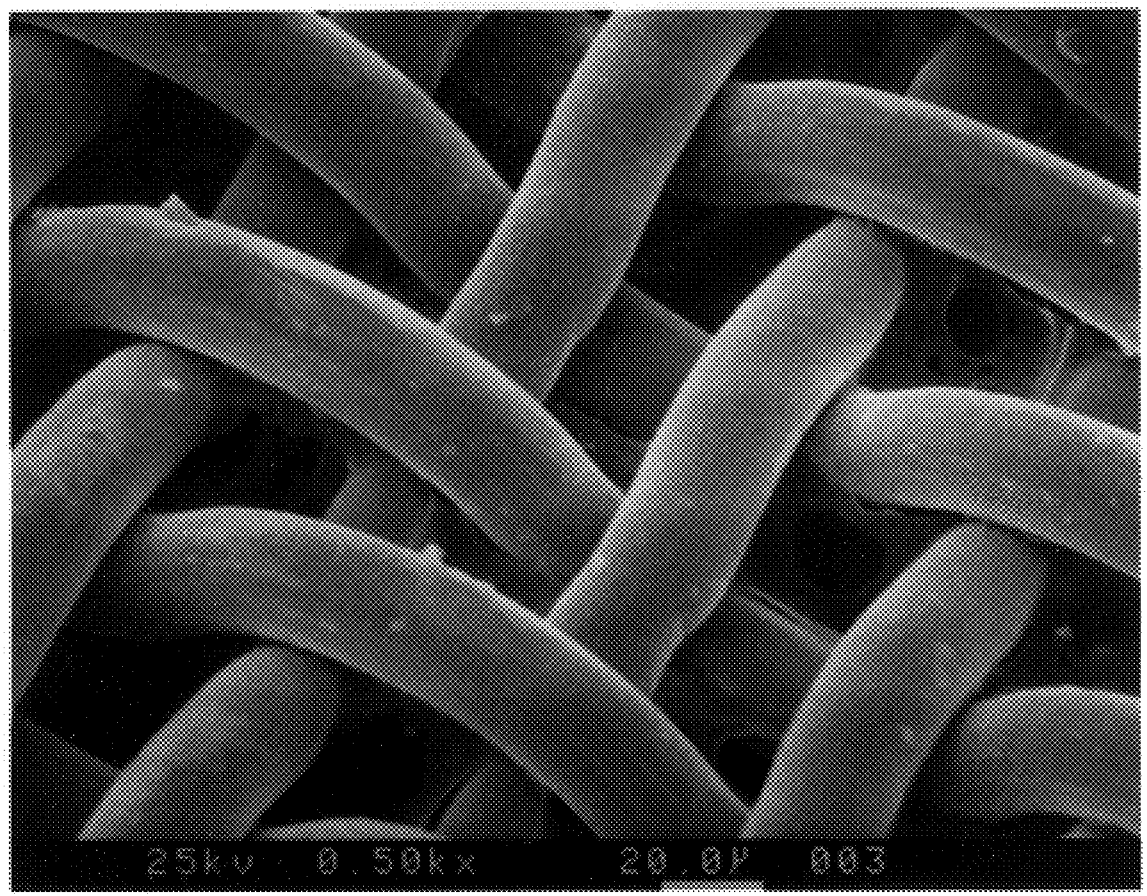
FIG. 13 is a SEM micrograph of the composite membrane of Example 10, illustrating a slight "strike-through" of PP—OH/PP material onto the uncoated side of the stainless steel reinforcing fabric.

The composite membrane was examined by SEM and was found to comprise a very thin coating layer of polymer on one side of the stainless steel fabric, as shown in FIG. 12. (Polymer coating layers having pore sizes varying in size from about 0.1 μm in diameter to 5 about 0.5 μm in diameter have been obtained by varying the composition of the coating solution and membrane-forming process conditions). The other (non-coated) side of the stainless steel fabric was found to contain a small amount of highly porous polymer film as "strike-through" between the individual strands (meshes) of the stainless steel fabric, as shown in FIG. 13. The PP—OH/PP coating (membrane) exhibited a strong adhesion to the stainless steel fabric which provided excellent mechanical strength to the composite.

While the invention has been described with reference to specific embodiments thereof it will be appreciated that numerous variations, modifications, and embodiments are possible, and accordingly, all such variations, modifications, and embodiments are to be regarded as being within the spirit and scope of the invention.

What is claimed is:

1. A method for preparing a porous hydrophilic polypropylene membrane, which comprises:

(a) forming a homogeneous mixture of hydrophobic polypropylene, functionalized polypropylene comprising from about 0.3 to about 10 mole % of functional groups selected from the group consisting of —OH, —NH$_2$, —COOH and mixtures thereof, and at least one fugitive hydrophilic pore-forming agent in a first solvent, said pore-forming agent (i) being soluble either in water or in a non-solvent for said hydrophobic polypropylene and (ii) exhibiting a chemical affinity for the functional groups in said functionalized polypropylene;

(b) depositing said homogeneous mixture on a casting surface;

(c) evaporating a portion of said first solvent to initiate a conversion of said homogeneous mixture to a gelled film;

(d) evaporating the remainder of said first solvent to complete the conversion of said homogeneous mixture into said gelled film; and (e) extracting said at least one hydrophilic pore-forming agent from said gelled film with a second solvent that is incapable of dissolving said hydrophobic polypropylene and said functionalized polypropylene, thereby forming a porous hydrophilic polypropylene membrane having functionalized polypropylene concentrated within the portions of the membrane that had been occupied by said fugitive pore-forming agent prior to the extraction thereof from said gelled film due to the chemical affinity of said pore-forming agent for the functional groups of said functionalized polypropylene.

2. The method according to claim 1, wherein said at least one fugitive hydrophilic pore-forming agent is selected from the group consisting of polyethylene glycol, polyvinylpyrrolidone, phenol and mixtures thereof.

3. The method according to claim 1, wherein said functionalized polypropylene has a viscosity average molecular weight of from abut 30,000 to about 1,000,000.

4. The method according to claim 1, wherein said casting surface is comprised of polytetrafluoroethylene.

* * * * *